United States Patent Office 3,801,646
Patented Apr. 2, 1974

3,801,646
STARTUP OF RHODIUM CATALYZED HYDRO-
FORMYLATION REACTIONS
Frank B. Booth, Placentia, Calif., assignor to Union Oil
Company of California, Los Angeles, Calif.
No Drawing. Filed Apr. 14, 1969, Ser. No. 816,117
The portion of the term of the patent subsequent to
May 12, 1987, has been disclaimed
Int. Cl. C07c 47/02, 47/28, 47/52
U.S. Cl. 260—604 HF                                   8 Claims

ABSTRACT OF THE DISCLOSURE

Hydroformylations of hydrocarbon olefins in the presence of rhodium or iridium catalysts are started up or initiated by introducing carbon monoxide into contact with the catalyst prior to introduction of the hydrogen. The carbon monoxide is supplied in an amount sufficient to expose the catalyst to a pressure of at least 1 and preferably at least 10 atmospheres prior to introducing the hydrogen into contact with the catalyst. It has been found that when the catalyst is first contacted with carbon monoxide in this fashion, a higher order of reactivity is achieved than when the reverse sequence is employed. In a typical embodiment, propylene is hydroformylated to butyraldehydes by contacting the propylene with a liquid reaction medium maintained under a carbon monoxide and hydrogen pressure at a temperature of from 30° to 300° C. and a pressure from 1 to 10,000 atmospheres wherein the reaction has been initiated by introducing the carbon monoxide before introduction of the hydrogen.

DESCRIPTION OF THE INVENTION

The invention relates to the hydroformylation of hydrocarbon olefins to produce carbonyl compounds and in particular relates to such reactions catalyzed by rhodium or iridium containing catalysts. The hydroformylation is achieved by contacting a hydrocarbon olefin with carbon monoxide and hydrogen in the presence of a liquid phase containing the catalyst. Various catalysts can be employed for the reaction including chelates or complexes of rhodium or iridium as well as rhodium or iridium hydrides and halide containing materials. Of these, the hydrides and, in particular, rhodium hydride, are generally the most active, however, various cocatalysts have been included with other forms of the catalyst to activate these to a suitable order of activity. With the less active forms of the catalyst it has been observed that an induction period is frequently encountered in the initiation of the reaction and, in many instances, the maximum conversion rate never reaches that achieved with a hydride catalyst.

It is an object of this invention to minimize induction periods for the initiation of rhodium or iridium catalyzed hydroformylations.

It is a purpose of this invention to provide a startup procedure for the hydroformylation of olefins with rhodium or iridium containing catalysts.

It is an object of this invention to provide a hydroformylation that can be performed under relatively mild conditions.

It is also an object of this invention to provide a hydroformylation that achieves a high normal to iso aldehyde product.

Other and related objects will be apparent from the following description of the invention.

I have now found that the aforecited objectives can be achieved by hydroformylation of hydrocarbon olefins with rhodium or iridium containing catalysts provided that the reaction is initiated by introducing the carbon monoxide reactant into contact with the catalyst prior to introduction of the hydrogen. When the catalyst is pressured to at least about 1 atmosphere with carbon monoxide prior to the introduction of the hydrogen, I have observed that the succeeding hydroformylation can be initiated without any appreciable induction period, whereas when the catalyst is first pressured with hydrogen and the carbon monoxide, a substantially lower order of reactivity is initially observed.

This result is particularly surprising since it applies to all forms of the catalyst which have been investigated, including the hydrides, halides, as well as chelate-containing catalysts. As applied to the hydride catalyst, it was generally believed that the hydride was the active form of the catalyst and, accordingly, it was expected that the initial introduction of hydrogen would aid the formation or stabilization of the catalyst more than the prior introduction of carbon monoxide. In contrast, however, it was found that even with the hydride form of the catalyst, the prior introduction of carbon monoxide resulted in a catalyst having a higher initial order of reactivity.

The process of hydrocarbonylation wherein my invention affords the greatest value is that described in copending applications Ser. Nos. 518,562 and 642,191 both now abandoned. The process comprises contacting a hydrocarbon olefin, carbon monoxide and hydrogen with a liquid reaction medium containing a homogeneous catalyst at temperatures from about 20° to about 300° C. and pressures from 1 to about 10,000 atmospheres. In the first of the aforementioned applications, the catalyst described is a Group VIII noble metal halide complex with carbon monoxide and a biphyllic ligand. Also included in the reaction medium is a cocatalyst comprising a polycyclic, heterocyclic, saturated amine having at least one nitrogen in a bridgehead position. In the other application aforementioned, the catalyst described is a Group VIII noble metal hydride complex with carbon monoxide and a biphyllic ligand.

The biphyllic ligands are organic compounds capable of forming a complex with the catalyst by coordinate covalent bonding and have one atom with an unshared pair of electrons for such bonding. These can be organic compounds of trivalent phosphorus, antimony, arsenic and bismuth. Typically, the biphyllic ligand is an aromatic phosphine such as triphenylphosphine. The invention is also applicable to catalysts comprising rhodium or iridium chelates such as are disclosed in Pat. No. 3,040,-090. The chelates are ring compounds formed by the reaction of the rhodium with a chelating agent which is a compound having two or more ligand groups, i.e., sites for coordinate covalent or electrostatic bonding to the metal and arranged so as to form a ring of 5 to 7 atoms upon reaction with the rhodium.

The hydrocarbon olefin can be any ethylenically unsaturated hydrocarbon having from 2 to about 25 carbons, preferably from 2 to about 15 carbons. The ethylenically unsaturated hydrocarbon has the following general structure:

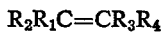

wherein $R_1$, $R_2$, $R_3$ and $R_4$ are hydrogen or the same or different alkyl, cycloalkyl, aryl, alkaryl, aralkyl or wherein one of said $R_1$ and $R_2$ and one of said $R_3$ and $R_4$ together form a single alkylene group having from 2 to about 8 carbons.

Examples of useful ethylenically unsaturated hydrocarbons are ethylene, propylene, butene-1, butene-2, 2-methylbutene-1, cyclobutene, hexene-1, hexene-2, cyclohexene, 3-ethylhexene-1, isobutylene, octene-1, 2-methylhexene-1, ethylcyclohexene, decene-1, cycloheptene, cyclooctene, cyclononene, 3,3'-dimethylnonene-1, dodecene-1, undecene-3, 6-propyldecene-1, tetradecene-2, 3-amyldecene-1, oligomers of olefins such as propylene tetramer, ethylene trimer, etc., hexadecene-1, 4-ethyltridecene-1, octadecene-1, 5,5-dipropyldodecene-1, vinylcyclohexane, allylcyclohexane, styrene, p-methylstyrene, alpha-methylstyrene, p-vinylcumene, beta-vinylnaphthalene, 1,1-diphenylethylene, allylbenzene, 6-phenylhexane-1, 1,3-diphenylbutene-1, 3-benzylheptene-1, divinylbenzene, 1-allyl-3-vinylbenzene, etc. Of the preceding, alpha hydrocarbon olefins and olefins having 2 to about 8 carbons are preferred, e.g., ethylene, propylene, butene-1, hexene-1, heptene-1, octene-1, etc.

The rhodium or iridium containing catalyst is present in the reaction zone as a metal hydride, complex chelate or salt, typically a halide. The catalyst can be complexed with a biphyllic ligand and there can also be incorporated in the reaction zone a polycyclic heterocyclic amine having a nitrogen in at least one bridgehead position. Examples of suitable sources of rhodium or iridium for use in the reaction include chloropentaamino rhodium(III)chloride, ammonium hexachloroiridate rhodium dicarbonyl chloride dimer, chloroiridic acid rhodium nitrate iridium tetrabromide, rhodium trichloride, bis(triphenylphosphine)iridium carbonyl, tris(triphenylphosphine)rhodium carbonyl hydride, tris(triphenylphosphine)iridium carbonyl hydride, tris(triphenylphosphine)rhodium(I)chloride, rhodium trichloride, rhodium acetate, rhodium trifluoride, rhodium oxide, ammonium hexachloro rhodate, bis(triphenylphosphine)rhodium carbonyl chloride, sodium hexachloro rhodate, etc.

When the catalyst is used in the form of a chelate, various chelating agents can be employed. The chelation of multivalent metallic ions into complexes comprises a well established field of modern chemistry. Informative sources on this subject are: Organic Sequestering Agents by Chaberek and Martell (1959) and The Sequestration of Metals by P. L. Smith (1959). Briefly, however, chelating agents have two or more atoms, commonly referred to as dentate centers, in the molecule which are capable of forming an ionic or a coordinate covalent bond with multivalent metal ions. The compounds are commonly called bidentate or polydentate compounds in reference to the number of dentate groups per molecule. The most common agents have oxygen and/or nitrogen atoms as such centers which are spaced in the molecule to form a 5, 6 or 7 member ring when the multivalent metal ion is bridged across the centers. Such organic compounds thus have at least two dentate centers, i.e., nitrogen or oxygen atoms which are separated by 1 to about 3 carbon atoms. Typical substituents in organic molecules which furnish the oxygen and/or nitrogen centers are aldehyde groups, nitro groups, amide groups, carboxyl groups, ester groups, ketone groups, nitroso groups, hydroxyls, etc.

Examples of chelating agents suitable for use in accordance with my invention are:

Hydroxymonobasic, hydroxydibasic and dibasic aliphatic acids such as glycolic acid, lactic acid, betahydroxy butyric acid, alphahydroxy butyric acid, glyceric acid, gluconic acid, maleic acid, tartaric acid, citric acid, etc.;

Carboxylic acid esters of glycol such as glycol monolaurate, glycol monostearate, glycol mono(p-tertiary) amyl benzoate, glycol monoacetate, glycol monopropionate, glycol monobutyrate, etc.;

Alkylenediamines, N-alkylalkylenediamines, N,N' - alkylalkylenediamines and alkylenediaminecarboxylic acids and their salts can also be used, particularly ethylenediamine, its carboxylic acids and salts thereof. Examples of such compounds are:

ethylenediamine,
N-methylethylenediamine,
N-ethylethylenediamine,
N-n-propylenediamine,
N-isopropylethylenediamine,
N-n-butylethylenediamine,
N-N-dimethylethylenediamine,
N,N-diethylethylenediamine,
N,N'-dimethylethylenediamine,
N,N'-diethylethylenediamine,
N,N'-di-n-propylethylenediamine,
propylenediamine,
2,2-dimethyl-1,2-diaminoethane,
2,3-dimethyl-2,3-diaminobutane,
trimethylenediamine,
2,2-dimethyl-1,3-diaminopropane,
2-hydroxy-1,3-diaminopropane,
tetramethylenediamine,
pentamethylenediamine,
ethylenediamine-N,N'-dipropionic acid,
N-butylethylenediaminetriacetic acid,
N-cyclohexylethylene-diaminetriacetic acid,
N-hydroxyethylethylenediaminetriacetic acid,
ethylenediaminetetraacetic acid,
trimethylenediaminetetraacetic acid,
tetramethylenediaminetetraacetic acid,
pentamethylenediaminetetraacetic acid,
1,2-diaminocyclohexane-N,N'-tetraacetic acid,
ethylenediamine-N,N'-dipropionic-N,N'-diacetic acid,
ethylenediamine-N,N'-tetrapropionic acid,
N-hydroxyethyl-N,N',N''-diethylenetriaminetetraacetic acid,
diethylenetriaminepentaacetic acid, etc.;

Aliphatic hydroxy ketones and hydroxy aldehydes can also be used such as 2-hydroxy-5-acetyl acetophenone, 2-hydroxy-4-butyl benzaldehyde, oxyquinolate, etc.

The catalyst can also be associated with a biphyllic ligand. This forms the preferred embodiment when the non-chelated rhodium catalysts are used.

The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

$$ER_3$$

wherein E is trivalent As, Sb, P, Bi or $P(O)_3$; R is the same or different alkyl having from 1 to 10 carbons, cycloalkyl having from 5 to 10 carbons, or aryl having from 6 to 10 carbons.

Preferably at least one R is aryl, e.g., phenyl, tolyl, xylyl, etc. having 6 to 9 carbons and, most preferably, the ligand is triaryl.

Examples of suitable biphyllic ligands having the aforementioned structure and useful in my invention to stabilize the catalyst composition are the following: trimethylphosphine, triethylarsine, tri-n-butylphosphite, triethylbismuthine, triisopropylstibine, dioctylcycloheptylphosphine, tricyclohexylphosphite, tricyclohexylphosphine, ethyldiisopropylstibine, tricyclohexylphosphine, methyldiphenylphosphine, methyldiphenylstibine, triphenylphosphine, triphenylphosphite, triphenylbismuthine, tri(o-tolyl)phosphine, phenyldiisopropylphosphine, phenyldiamylphosphine, ethyldiphenylphosphine, phenylditolylphosphine, xylyldiphenylarsine, tolyldi(m-xylyl)stibine, trixylylphosphine, trixylylarsine, trixylylstibine, cyclopentyldixylylstibine, dioctylphenylphosphine, tridurylphosphine, trixylylbismuthine, etc. Of the aforementioned, the aryl phosphines and particularly the triarylphosphines (e.g., triphenylphosphine) are preferred because of their greater activity.

The Group VIII metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300 percent) of that stoichiometrically required to form a complex with the Group VIII metal. The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide, etc., may be, but need not be, included in the complex catalyst of this invention. These components may be incorporated in the catalyst by the formation of the catalyst complex from a Group VIII metal salt of the indicated anions.

As previously mentioned, a cocatalyst which can be employed with the rhodium or iridium halide catalyst for the hydroformylation reaction is a poly(heterocyclic) amine having at least one nitrogen in a bridgehead position. The term "bridgehead position" is well established in chemical nomenclature to identify the position of an atom which is common to at least two of the rings of the polycyclic compound. Preferably the amine is an atom-bridged system, i.e., atoms, generally methylene carbons, form the bridge or link in the molecule rather than a simple valence bonding. The amine can be used also in catalytic amounts, e.g., from about 0.001 to about 10 weight percent; preferably from about 0.05 to 5 weight percent of the liquid reaction medium. In general, amines having from 1 to about 4 nitrogen atoms and from 1 to about 25 carbons; preferably from 2 to about 10 carbons; can be employed for this purpose and the following is a listing of representative amines useful in my invention:

1,2,4-triazabicyclo(1.1.1)pentane;
1,5,6-triazabicyclo(2.1.1)hexane;
5-oxa-1,6-diazabicyclo(2.1.1)hexane;
5-thia-1,6-diazabicyclo(2.1.1)hexane;
2-oxa-1,5,6-triazabicyclo(2.1.1)hexane;
1,2,5,6-tetrazabicyclo(2.1.1)hexane;
5-oxa-1,2,3,6-tetrazabicyclo(2.1.1)hexane;
1-azabicyclo(3.3.1)heptane;
1-azabicyclo(2.2.1)heptane;
1,4-methano-1,1-pyridine;
2-ox-1-azabicyclo(2.2.1)heptane;
1,4-diazabicyclo(2.2.1)heptane;
7-oxa-1-azabicyclo(2.2.1)heptane;
7-thia-1-azabicyclo(2.2.1)heptane;
1,7-diazabicyclo(2.2.1)heptane;
1,3,5-triazabicyclo(2.2.1)heptane;
1-azabicyclo(3.2.1)octane;
1,5-diazatricyclo(4.2.1)decane;
1,7-diazatricyclo(3.3.1.2)undecane;
7-ox-1-azabicyclo(3.2.1)octane;
1,7-diazabicyclo(3.2.1)octane;
3-thia-1,7-diazabicyclo(3.2.1)octane;
1,3,6,8-tetrazatricyclo(6.2.1)dodecane;
2,8-diazatricyclo(7.3.1.1)tetradecane;
1-azabicyclo(3.3.1)nonene, also known as 1-isogranatinine and the oxo, hydroxy and lower alkyl derivatives thereof;
1-azabicyclo(2.2.2)octane also known as quinuclidine as well as the halo, oxo, hydroxy and lower alkyl derivatives thereof;
1-azatricyclo(3.3.1.1)decane;
1,3-diazabicyclo(2.2.2)octane;
1,3-diazabicyclo(3.3.1)nonene;
1,6-diazatricyclo(5.3.1)dodecane;
2-ox-1-azabicyclo(2.2.2)octane;
4,6,10-triox-1-azatricyclo(3.3.1)decane;
1,5-diazabicyclo(3.3.1)nonene;
1,2,5,8-tetrazatricyclo(5.3.1.1)dodecane;
1,4-diazabicyclo(2.2.2)octane also known as triethylene diamine and its oxo, hydroxy, halo and lower alkyl derivatives thereof;
1,3-diazatricyclo(3.3.1.1)decane also known as 1,3-diazadamantane;
1,3,5-triazatricyclo(3.3.1)decane;
1,3,5,7-tetrazabicyclo(3.3.1)nonene also known as pentamethylene tetramine;
1,3,5,7-tetrazatricyclo(3.3.1.1)decane also known as hexamethylenetetramine;
2-oxa-1,3,4-triazabicyclo(3.3.1)nonene;
1-azabicyclo(4.3.1)decane;
1-azabicyclo(3.2.2)nonene;
1,5-diazabicyclo(3.2.2)nonene;
1,3,5,7-tetrazabicyclo(3.3.2)decane;
1,5-diazabicyclo(3.3.3)undecane, etc.

Of the aforementioned poly(heterocyclic)amines having a nitrogen in a bridgehead position the most common and widely known compound is 1,4-diazabicyclo-(2.2.2)octane (triethylenediamine) and this material as well as its oxo, hydroxy, halo and lower alkyl derivatives comprises the preferred cocatalyst for use in my process.

The reaction is performed under liquid phase conditions and, when the olefin comprises a liquid at the reaction conditions, the olefin can be used in excess to provide the liquid reaction medium. If desired, however, any suitable organic liquid can be employed as a reaction solvent; preferably, organic solvents which are inert to the reaction conditions, the reactants, the catalyst and the products are employed. Examples of suitable solvents which can be used in accordance with my invention include hydrocarbons such as the aromatic, aliphatic or alicyclic hydrocarbons, ethers, esters, ketones, etc.

Examples of suitable hydrocarbons that can be employed in the solvents include aromatic hydrocarbons such as benzene, toluene, xylene, ethylbenzene, Tetralin, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, e.g., cyclopentane, cyclohexane, methylcyclopentane, Decalin, indane, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, diisobutyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malenate, valerolactone, ethyl benzoate, methyl salicylate, n-propylbenzoate, n-dibutyl oxalate, n-butyl benzoate, diisoamyl phthalate, dimethyl phthalate, diethyl phthalate, benzyl benzoate, n-dibutyl phthalate, etc. A preferred class of ester solvents includes the lactones, e.g., butyrolactone, valerolactone and their derivatives having lower ($C_1$–$C_5$) alkyl substituents.

Alcohols can also be employed as a reaction solvent. Preferably tertiary alcohols are employed since these materials are substantially non-reactive under the reaction conditions. Primary and secondary alcohols can be employed but are less preferred since these materials can react with aldehyde compounds under the reaction conditions to produce acetals. While in some instances these may be desired products, it is generally desirable to produce the carbonyl compound or alcohol directly without the formation of the acetal. It is of course apparent, if desired, that the acetal can be hydrolyzed to obtain the aldehyde. Examples of alcohols that can be employed as solvents include the aliphatic and alicyclic alcohols such as methanol, ethanol, isopropanol, butanol, t-butanol, t-amyl alcohol, hexanol, cyclohexanol, etc.

The reaction can be performed under relatively mild conditions including temperatures from 20° to 300° C., preferably from 50° to 250° C., and most preferably from 75° to 175° C. The pressure for the reaction should be sufficient to maintain the solvent in liquid phase under the reaction conditions and, preferably, sufficient to provide a satisfactory rate of conversion. The pressure can be from 1 to about 10,000 atmospheres, preferably from 10 to about 100, and most preferably, from 50 to about 300 atmospheres. In some instances, the low pressures from about 1 to 20 atmospheres may be preferred, particularly when it is desired to achieve a high selectivity to normal or straight chain aldehydes. This can be important when carbonylating higher molecular weight $\alpha$-olefins, e.g., those having from 5 to about 20 carbons where the objective is to prepare substrates for conversion to fatty alcohols or acids. Under these conditions, it may be more practical to operate at the aforementioned low pressures and accept a low conversion rate to attain the high selectivity to normal aldehydes which can be from about 10:1 to 20:1 normal to iso aldehyde. The carbon monoxide and hydrogen can be introduced into the reactor in relative molal ratios from about 1 to 10, to about 10 to 1, parts of carbon monoxide per part of hydrogen. Preferably, the gas reactants are introduced in molal ratios of from about 3:1 to 1:3 and, most preferably, at about equal molal concentrations.

As previously mentioned, this invention is based on the discovery that the contacting of the catalyst with the carbon monoxide prior to introduction of the hydrogen achieves a catalyst having a higher initial activity whereby the reaction can be commenced without any prolonged induction period. It is therefore within the scope of the invention to introduce carbon monoxide into contact with the catalyst in the reaction zone by introducing the carbon monoxide to a pressure of at least 1 and preferably at least about 10 atmospheres before introduction of the hydrogen. After the initial pressuring of the catalyst with the carbon monoxide the balance of the carbon monoxide and the hydrogen can then be added in any desired sequence. All of the hydrogen can be added after the initial pressuring of the catalyst with carbon monoxide or the hydrogen and the balance of the carbon monoxide can be introduced together or sequentially to raise the pressure on the catalyst to the desired reaction pressure. Preferably, however, all of the carbon monoxide to be used in initiation of the reaction is applied initially followed by the addition of the hydrogen. After the catalyst in the reaction zone has been brought to the desired reaction pressure by the aforementioned introduction of carbon monoxide and hydrogen, the reaction zone can be heated to the desired reaction temperature and the reaction initiated.

The reaction can be performed batchwise or in a continuous fashion. When operating batchwise, the catalyst, the reaction medium and the olefin can be introduced into the reaction zone and the reaction zone can then be pressured with the carbon monoxide and hydrogen in the aforedescribed manner and heated to the desired reaction temperature. The reaction can be continued with the initial charge of reactants until substantially completed as indicated by the achievement of a steady state reaction pressure or other suitable means. When the olefin is a gas under the reaction conditions, it can be introduced in a continuous fashion into the batchwise process by bubbling the gas together with makeup carbon monoxide and hydrogen into contact with the liquid reaction medium. Upon completion of the reaction or when the concentration of carbonylated products has reached an optimum in the liquid medium, the reaction can be discontinued and the products can be recovered from the reaction medium by conventional separation techniques such as fractional distillation.

When continuous processing is employed, the catalyst and reaction medium can be charged to the reaction zone initially and pressured in the aforedescribed manner with carbon monoxide and hydrogen and then heated to reaction temperature. The reactant olefin, carbon monoxide and hydrogen can then be introduced in a continuous fashion while removing an effluent containing the carbonylated products from the reaction zone. When the olefin is a gas at the reaction conditions, it, any any make-up carbon monoxide and hydrogen, can be bubbled into contact with the liquid reaction medium and will serve to strip the carbonylated products from the reaction zone in a vapor effluent. The vapor effluent can then be cooled to condense the carbonylated products and the non-condensible hydrocarbon olefin, carbon monoxide and hydrogen can be recycled to further contact in the reaction zone. The products can also be recovered from the reaction zone by continuously or intermittently withdrawing a portion of the liquid reaction medium and distilling this reaction medium to recover the carbonylated products from the reaction solvent and the catalyst contained in the liquid effluent. The reaction solvent and catalyst can then be recycled to further contacting in the reaction zone.

The following examples will illustrate the laboratory practice of the invention and demonstrate the results obtained thereby:

Example 1

A one-half gallon autoclave is charged with 0.5 gram tris(triphenylphosphine)rhodium hydride carbonyl, 5 grams excess triphenylphosphine and 500 milliliters toluene. The autoclave is then charged with 100 grams propylene, closed and pressured to 300 p.s.i.g. with carbon monoxide. Hydrogen is then added to raise the pressure an additional 300 p.s.i. and the autoclave is heated to 95° C. and maintained at that temperature for a period of 4 minutes, during which the reaction pressure is observed to decrease 200 p.s.i. The autoclave is then cooled, depressured, opened and the liquid products are weighed to reveal that 62 grams weight increase occurred. Analysis of the products reveals that they consist essentially of butyraldehydes having a normal to iso ratio of 2.1.

The aforedescribed reaction is repeated, however the sequence of addition of hydrogen and carbon monoxide are reversed by pressuring the autoclave to 300 p.s.i.g. with hydrogen and then adding 300 p.s.i. of carbon monoxide. Upon heating the autoclave to 95° C., a reaction occurred; however after 20 minutes the pressure drop observed was only 100 p.s.i. After this 20 minute period, the reaction was discontinued and the products were weighed to reveal a 35 gram weight increase which consisted essentially of normal and isobutyraldehydes.

The same effect of enhanced activity can be observed when the aforeillustrated sequential introduction of carbon monoxide followed by hydrogen is practiced when 0.5 gram tris(triphenylphosphite) rhodium hydride carbonyl and 5 grams excess phosphite are substituted for the catalyst and phosphine used in the preceding experiment.

Similar enhancement of the carbonylation can be observed using the sequential introduction of carbon monoxide followed by hydrogen when catalysts such as tris(triphenylphosphine) iridium carbonyl hydride or rhodium chloride tritolylphosphine and 1,4-diazobicyclo(2.2.2)-octane are substituted for the afore-illustrated catalyst while following the same aforeillustrated mode of practice.

Example 2

To the autoclave are charged 0.28 gram rhodium carbonyl acetylacetonate [$Rh(CO)_2C_5H_8O_2$], 5 milliliters acetylacetonate, 500 milliliters toluene and 122 grams propylene. The autoclave is pressured to 300 p.s.i.g. with carbon monoxide and the hydrogen is added to raise the pressure 300 p.s.i. The autoclave contents are heated to 95° C. with stirring and, within 7 minutes, the pressure drops 200 p.s.i.g. The autoclave is cooled, depressured and the liquid products weighed to reveal 51 grams weight increase. The products are butyraldehydes having a normal to iso ratio of 0.95.

Similar results can be achieved from other chelates without departing from the illustrated mode of practice simply by substituting any of the chelating agents, aforedescribed, for the acetylacetonate in the preceding experiment. Examples of such are the iridium or rhodium oxyquinolates, e.g., rhodium oxyquinolate yields butyraldehydes from propylene having a normal to iso ratio of about 1.6 and valeroaldehydes from butene-2 with a normal to iso ratio of about 0.6. Similarly, the rhodium chelates of the monophenyl and diphenyl substituted acetylacetonate yields butyraldehydes from propylene with normal to iso ratios of 0.9.

The experiment is repeated with the sequential order of carbon monoxide and hydrogen introduction reversed by pressuring the autoclave to 300 p.s.i.g. with hydrogen followed by adding carbon monoxide to raise the pressure an additional 300 p.s.i. The autoclave contents are heated to 95° C. while stirring and held at that temperature until the pressure decreased 200 p.s.i., a period of 40 minutes. Thereafter the autoclave is cooled, depressured and the reaction product weighed to reveal 26 gram weight increase. The products are butyraldehydes with a normal to iso ratio of 0.80.

The same enhancement in rate can be observed with other olefins simply by substituting the olefins for propylene without departing from the mode of practice. An example of such is the substitution of 130 grams butene-2 for propylene of the preceding experiment.

The preceding examples are intended to illustrate the presently contemplated best mode of practice. It is apparent that other reagents, catalysts and reactants described hereinabove can be directly substituted for those employed in the illustrations without departing from the illustrated mode of practice.

I claim:
1. In the hydrocarbonylation of an ethylenically unsaturated hydrocarbon having from 2 to about 25 carbons, wherein said hydrocarbon is contacted with carbon monoxide and hydrogen within a liquid reaction medium containing a rhodium or iridium catalyst in complex association with carbon monoxide and a biphyllic ligand having the structure of:

$$ER_3$$

wherein E is selected from the class consisting of P, As, Bi, Sb and P(O)$_3$ and R is a member of the class consisting of alkyl having from 1 to 8 carbons and aryl having from 6 to 8 carbons,
at a temperature of from 20 to 300° C. and a pressure of from 1 to 10,000 atmospheres, the improvement comprising initiating the hydrocarbonylation reaction by contacting the liquid reaction medium and said catalyst with carbon monoxide at a pressure of at least about 1 atmosphere before contacting said reaction medium with hydrogen.

2. The hydrocarbonylation of claim 1 wherein said catalyst is also in complex association with hydride.

3. The hydrocarbonylation of claim 1 wherein said ligand is triphenylphosphine.

4. The hydrocarbonylation of propylene which comprises the steps of (1) contacting a liquid reaction medium which is inert in the hydrocarbonylation and which contains a rhodium catalyst in complex association with hydride, carbon monoxide and a biphyllic ligand having the structure of:

$$PR_3$$

wherein R is a member of the class consisting of alkyl having from 1 to 8 carbons and aryl having from 6 to 8 carbons; 
with carbon monoxide at a pressure of at least 10 atmospheres, and (2) thereafter contacting said liquid reaction medium containing said catalyst with carbon monoxide and hydrogen at a mole ratio of from about 1 to 10 to about 10 to 1 parts of carbon monoxide per part of hydrogen at a temperature of from 20° to about 300° C. and a pressure of from about 1 to 10,000 atmospheres.

5. The hydrocarbonylation defined in claim 4 wherein said catalyst is tris(triphenylphosphine)rhodium hydride carbonyl.

6. The hydrocarbonylation defined in claim 4 wherein said reaction medium also contains a co-catalyst consisting of a bicyclic or tricyclic amine having 2 to about 10 carbons and 1 to 4 nitrogens with at least one nitrogen in a bridgehead position.

7. The hydrocarbonylation defined in claim 6 wherein said co-catalyst is 1,4-diazobicyclo(2.2.2)octane.

8. The hydrocarbonylation defined in claim 4 wherein said mole ratio is from 1 to 3 to about 3 to 1 parts of carbon monoxide per part of hydrogen and said pressure is from about 10 to about 100 atmospheres.

References Cited
UNITED STATES PATENTS 3,594,425   7/1971   Brader et al. ____ 260—604 HF
3,527,809   9/1970   Pryett et al. _____ 260—604 HF
3,511,880   5/1970   Booth _____ 260—604 HF

OTHER REFERENCES

Evans et al., Chem. Soc. Journal, Part A, Inorganic Chem., December 1968, pp. 3133–3142.

JOSEPH E. EVANS, Primary Examiner

U.S. Cl. X.R.

260—598, 599